US005548744A

United States Patent [19]

Ogura et al.

[11] Patent Number: 5,548,744

[45] Date of Patent: Aug. 20, 1996

[54] MEMORY CIRCUIT AND METHOD FOR SETTING AN OPERATION MODE

[75] Inventors: Toshihiko Ogura, Ebina; Hiroaki Aotsu; Koichi Kimura, both of Yokohama; Hiromichi Enomoto; Tadashi Kyoda, both of Hadano, all of Japan

[73] Assignee: Hitachi, Ltd., Tokyo, Japan

[21] Appl. No.: 354,934

[22] Filed: Dec. 12, 1994

Related U.S. Application Data

[63] Continuation of Ser. No. 123,357, Sep. 17, 1993, abandoned, and a continuation-in-part of Ser. No. 349,403, May 8, 1989, Pat. No. 5,175,838, which is a continuation of Ser. No. 240,380, Aug. 29, 1988, Pat. No. 4,868,781, which is a continuation of Ser. No. 779,676, Sep. 24, 1985, abandoned, said Ser. No. 123,357, is a continuation of Ser. No. 13,174, Jan. 29, 1993, Pat. No. 5,265,234, which is a continuation of Ser. No. 816,583, Jan. 3, 1992, abandoned, which is a continuation of Ser. No. 314,238, Feb. 22, 1989, Pat. No. 5,113,487, which is a continuation of Ser. No. 864,502, May 19, 1986, abandoned.

[30] Foreign Application Priority Data

| | | | |
|---|---|---|---|
| May 20, 1985 | [JP] | Japan | 60-105844 |
| May 20, 1985 | [JP] | Japan | 60-105845 |

[51] Int. Cl.[6] ........ G06F 12/00

[52] U.S. Cl. ........ 395/494; 364/DIG. 1; 364/DIG. 2; 364/244; 364/244.1; 364/244.2

[58] Field of Search ........ 364/DIG. 1 MS File, 364/DIG. 2 MS File; 395/375, 400, 425, 800, 401, 427, 428, 432, 492, 494, 497.01

[56] References Cited

U.S. PATENT DOCUMENTS

| | | | |
|---|---|---|---|
| 3,787,817 | 1/1974 | Goldberg | 395/425 |
| 4,096,565 | 6/1978 | Ruckdeschel et al. | 364/DIG. 1 |
| 4,467,443 | 8/1984 | Shima | 395/425 |

*Primary Examiner*—Robert B. Harrell
*Attorney, Agent, or Firm*—Antonelli, Terry, Stout & Kraus

[57] ABSTRACT

In a memory circuit having a memory device operative to read, write and hold data and an operation unit implementing computation between a first datum supplied externally and a second datum read out of the memory device, a selector for selecting one of operational function specification data preset externally and a selector for selecting one of bit write control data present externally are given with select control signals, so that a frame buffer memory operative in read-modify-write mode can be used commonly.

8 Claims, 11 Drawing Sheets

FIG. 7

| FC | | | | DI |
|---|---|---|---|---|
| FC3 | FC2 | FC1 | FC0 | |
| 0 | 0 | 0 | 0 | DO |
| 0 | 0 | 0 | 1 | $\overline{DO}$ |
| 0 | 0 | 1 | 0 | $D \oplus DO$ |
| 0 | 0 | 1 | 1 | $\overline{D \oplus DO}$ |
| 0 | 1 | 0 | 0 | 0 |
| 0 | 1 | 0 | 1 | 1 |
| 0 | 1 | 1 | 0 | D |
| 0 | 1 | 1 | 1 | $\overline{D}$ |
| 1 | 0 | 0 | 0 | $\overline{D} \cdot DO$ |
| 1 | 0 | 0 | 1 | $D + \overline{DO}$ |
| 1 | 0 | 1 | 0 | $D + DO$ |
| 1 | 0 | 1 | 1 | $\overline{D} \cdot \overline{DO}$ |
| 1 | 1 | 0 | 0 | $D \cdot DO$ |
| 1 | 1 | 0 | 1 | $\overline{D} + \overline{DO}$ |
| 1 | 1 | 1 | 0 | $D \cdot \overline{DO}$ |
| 1 | 1 | 1 | 1 | $\overline{D} + DO$ |

MEMORY CIRCUIT AND METHOD FOR SETTING AN OPERATION MODE

CROSS-REFERENCE TO RELATED APPLICATIONS

This application is a continuation of application of now abandoned Ser. No. 08/123,357, filed on Sep. 17, 1993 which is a continuation of application Ser. No. 08/013,174, filed on Jan. 29, 1993 which issued as U.S. Pat. No. 5,265,234; which is a continuation of application Ser. No. 07/816,583, filed on Jan. 3, 1992, now abandoned; which is a continuation of application Ser. No. 07/314,238, filed Feb. 22, 1989, now U.S. Pat. No. 5,113,487; which is a continuation of application Ser. No. 06/864,502, filed May 19, 1986, now abandoned; and a continuation-in-part of application Ser. No. 07/349,403, filed May 8, 1989, now U.S. Pat. No. 5,175,838; which is a continuation of application Ser. No. 07/240,380, filed Aug. 29, 1988, now U.S. Pat. No. 4,868, 781; which is a continuation of application Ser. No. 06/779, 676, filed Sep. 24, 1985 now abandoned.

BACKGROUND OF THE INVENTION

This invention relates to a memory circuit and, particularly, to a memory circuit suitably used for a frame buffer in a high-speed graphic display system.

Recent developments regarding enhanced resolution of graphic display units requires a large-capacity memory for use as a frame buffer for holding display information. In displaying a frame of graphic data, a great many access operations to a capacious frame buffer take place, and therefore high-speed memory read/write operations are required. A conventional method for coping with this requirement is the distribution of processing.

An example of the distributed process is to carry out part of the process with a frame buffer. FIG. 2 shows, as an example, the arrangement of the frame buffer memory circuit used in the conventional method. The circuit includes an operation unit 1, a memory 2, an operational function control register 3, and a write mask register 6. The frame buffer includes written data in bit units regardless of the word length of the memory device. On this account, the frame buffer writing process necessarily implements operation and writing both in bit units. In the example of FIG. 2, bit operation is implemented by the operation unit 1 and operational function control register 3, while bit writing is implemented by the mask register 6 only for bits effective for writing. This frame buffer is designed to implement the memory read-modify-write operation in the write cycle for data D from the data processor, eliminating the need for the reading data D0 out of the memory, which the usual memory necessitates in such operation, to thereby increase the speed of the frame buffer.

FIG. 3 shows another example of a distributed process which is applied to a graphic display system consisting of two data processors 10 and 10' linked through a common bus 11 with a frame buffer memory 9". The frame buffer memory 9" is divided into two areas a and b which are operated for display by the data processors 10 and 10', respectively. FIG. 4 shows an example of display made by this graphic system. The content of the frame buffer memory 9" is displayed on the CRT screen, which is divided into upper and lower sections in correspondence to the divided memory areas a and b as shown in FIG. 4. When it is intended to set up the memory 9" for displaying a circle, for example, the data processor 10 produces an arc $\alpha\alpha'\alpha''$ and the data processor

10' produces a remaining arc $\beta\beta'\beta''$ concurrently. The circular display process falls into two major processings of calculating the coordinates of the circle and writing the result into the frame buffer. When the calculation process takes a longer time than the writing process, use of the two processors 10 and 10' for the process is effective for increasing the speed of display. If, on the other hand, the writing process takes a longer time, the two processors conflict over the access to the frame buffer memory 9", resulting in a limited effectiveness of the dual processor system. Recently advanced LSI technology has significantly reduced the computation time of data processors relative to the memory write access time, which fosters use of a frame buffer memory requiring less access operations such as one 9' shown in FIG. 2.

In application of the frame buffer memory 9' shown in FIG. 2 to the display system shown in FIG. 3, when both processors share in the same display process as shown in FIG. 4, the memory modification function is consistent for both processors and no problems will arise. In another case, however, if one processor draws graphic display a' and another processor draws character display b' as shown in FIG. 5, the system is no longer so uneventful. In general, different kinds of display are accompanied by different memory modification operations, and if two processors alternately access the frame buffer memory, the setting for the modification operation and the read-modify-write operation need to take place in each display process. Setting for modification operation is identical to memory access when seen from the processor, and such double memory access ruins the attempt at increasing the processing speed.

A conceivable scheme for reducing the number of computational settings is the memory access control in which one processor makes access to the frame buffer several times and then hands over the access right to another processor, instead of the alternate memory access control. However, this method requires additional time for the process of handing over the access right between the processors as compared with the display process using a common memory modification function. Namely, the conventional scheme of sharing in the same process among more than one data processor as shown in FIG. 4 is recently shifting to the implementation of separate processes as shown in FIG. 5 with a plurality of data processors, as represented by the multi-window system, and the memory circuit is not designed in consideration of this regard.

An example of the frame buffer of this type using the read-modify-write operation is disclosed, for example, in article entitled "Designing a 1280-by-1024 pixel graphic display frame buffer in a 64K RAM with nibble mode", Nikkei Electronics, pp. 227–245, published on Aug. 27, 1984.

SUMMARY OF THE INVENTION

The present invention is intended to deal with the foregoing prior art deficiency, and its prime object is to provide a memory circuit with logical functions for use in constructing a frame buffer suitable for the multiple processors' parallel operations with the intention of realizing a high-speed graphic display system.

In general, when a resource is intended to be shared by a plurality of processors, resource access arbitration control is necessary, and when it is intended for a plurality of processors to share in a process for the purpose of increasing processing speed, they are required to operate and use resources in unison. These controls are generally implemented by the program of each processor, and it takes some processing time. Resources commonly used among processors include peripheral units and a storage unit. A peripheral unit is used exclusively for a while once a processor has begun its use, while the storage unit is accessed by processors on a priority basis. The reason for the different utilization modes of the resources is that a peripheral unit has internal sequential operating modes and it is difficult for the unit to suspend the process in an intermediate mode once the operation has commenced, while the storage unit completes the data read or write operation within the duration of access by a processor and its internal operating mode does not last after the access terminates.

When it is intended to categorize the aforementioned memory implementing the read-modify-write operation in the above resource classification, the memory is a peripheral unit having the internal modification function, but the internal operating mode does not last beyond the access period, and the memory operates faster than the processor. Accordingly, the memory access arbitration control by the program of the low-speed processor results in an increased system overhead for the switching operation, and therefore such control must be done within the memory circuit. The memory circuit implementing the read-modify-write operation does not necessitate internal operating modes dictated externally and it can switch the internal states to meet any processor solely by the internal memory operation.

The present invention resides in a memory circuit including a memory device operative to read, write and hold data, an operator which performs computation between first data supplied from outside and second data read out of the memory device, means for specifying an operational function from outside, and means for controlling bit writing from outside, wherein the operational function specifying means issues a selection control signal to a selector which selects one of a plurality of operational functions specifying data supplied from outside, and wherein the bit writing control means issues a selection control signal to a selector which selects one of a plurality of bit writing control data supplied from outside, so that a frame buffer memory which implements the read-modify-write operation can be used commonly.

BRIEF DESCRIPTION OF THE DRAWINGS

FIG. 7 is a table used to explain the operational function of the embodiments shown in FIG. 6;

DESCRIPTION OF THE PREFERRED EMBODIMENTS

Figure 1:
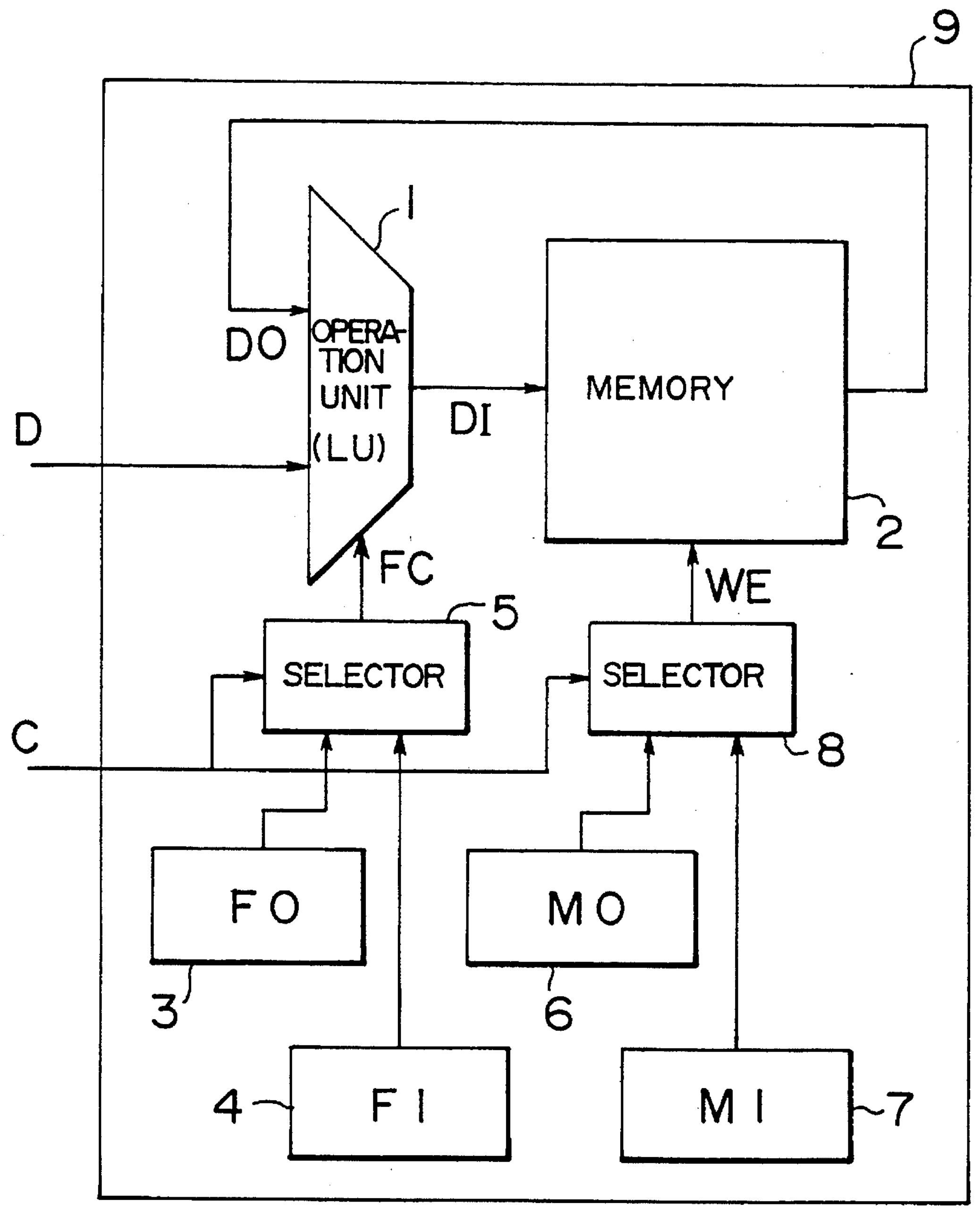
FIG. 1 is a block diagram showing the memory circuit embodying the present invention.
Figure 2:
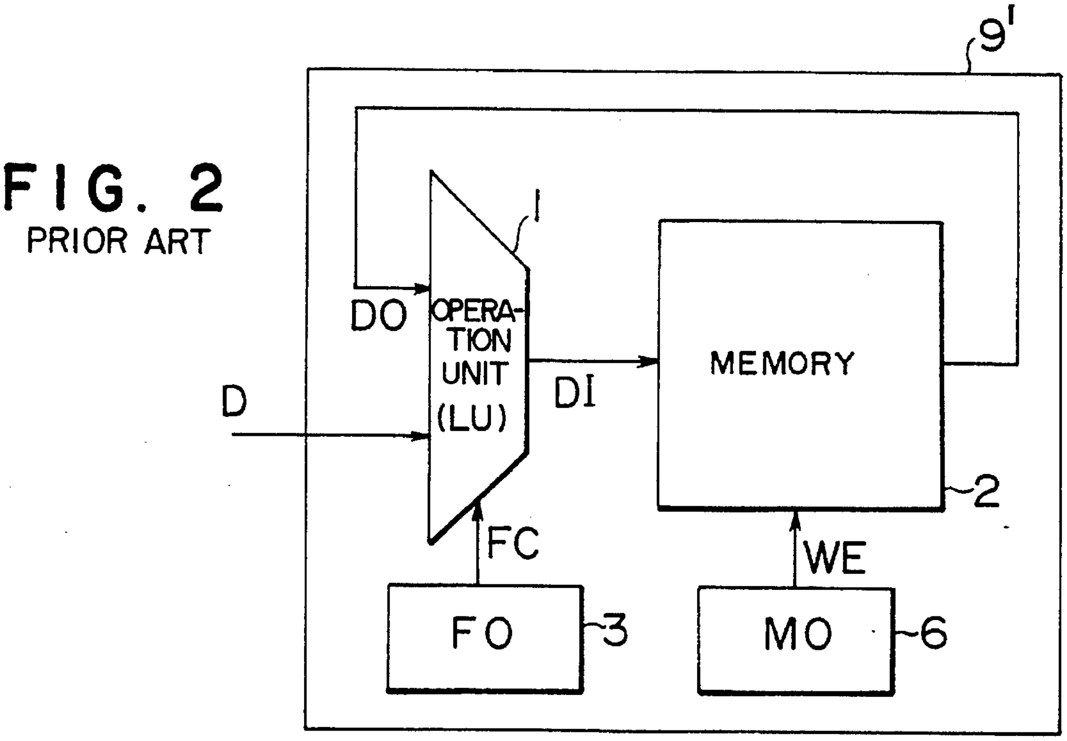
FIG. 2 PRIOR ART
FIG. 2 is a block diagram showing the conventional memory circuit.
Figure 3:
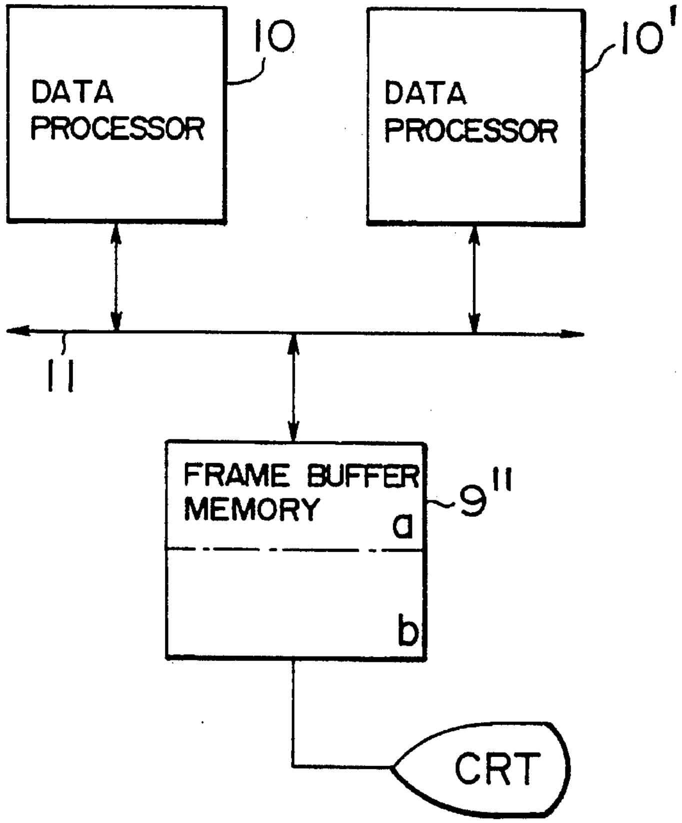
FIG. 3 PRIOR ART
FIG. 3 is a block diagram showing the conventional graphic display system.
Figure 4:
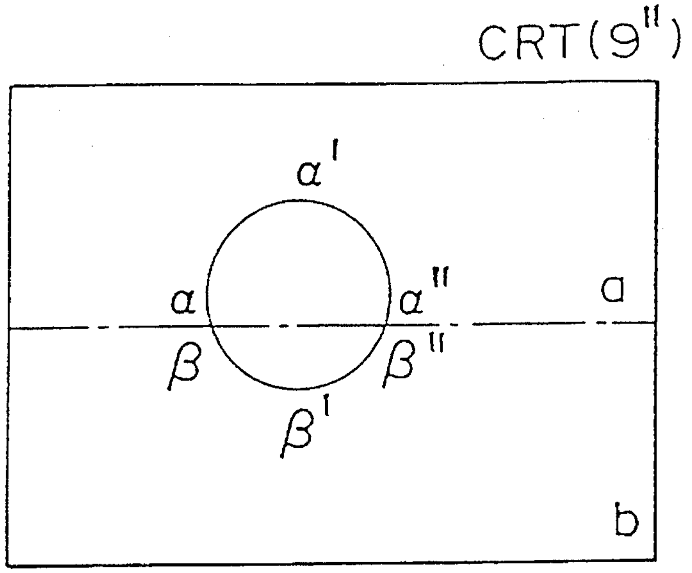
FIG. 4 PRIOR ART
FIG. 4 is a diagram explaining that two processors implement graphic display.

An embodiment of the present invention will now be described in detail with reference to the drawings. The frame buffer memory circuit shown in FIG. 1 includes an operation unit (LU) 1 for implementing the modification functions for the read-modify-write operation, a data memory 2, operational function specifying registers 3 and 4 for specifying an operational function of the operation unit, an operational function selector 5 for selecting an operational function, write mask registers 6 and 7 for holding write mask data, and a write mask selector 8 for selecting write mask data. Symbol D denotes write data sent over the common bus, and symbol C denotes a selection signal for controlling the operational function selector 5 and write mask selector 8.

Figure 6:
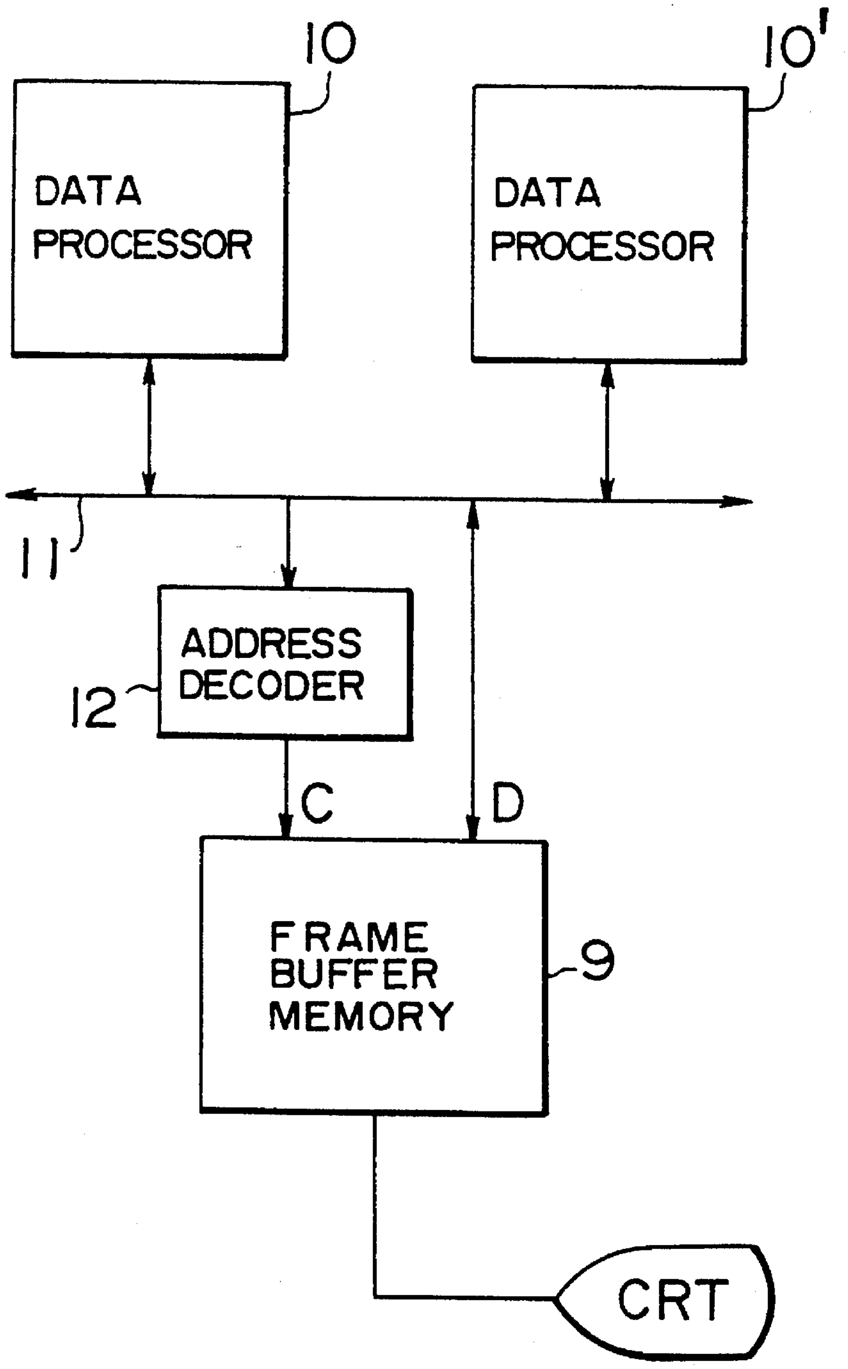
FIG. 6 is a block diagram showing the multi-processor graphic display system embodying the present invention.

FIG. 6 is a block diagram showing the application of the inventive frame buffer memory circuit 9 shown in FIG. 1 to the multi-processor system, which includes data processors 10 and 10', a common bus 11 and an address decoder 12.

The following disclosure describes, as an example, the operation of this embodiment. For clarification purposes, FIGS. 1 and 6 do not show the memory read data bus, memory block address decoder and read-modify-write control circuit, none of which are essential for explanation of this invention. In this embodiment, the memory circuit 9 is addressed from 800000H to 9FFFFFH. The memory circuit 9 itself has a 1M byte capacity in a physical sense, but it is addressed double in the range 800000H–9FFFFFH to provide a virtual 2M byte address space. The method of double addressing is such that address 800000H and address 900000H contain the same byte data, and so on, and finally address 8FFFFFH and address 9FFFFFH contain the same byte data. Accordingly, data read by the processor 10 at address 8xxxxxH is equal to data read at address 9xxxxxH, provided that the address section xxxxx is common. The purpose for double addressing the memory circuit 9 beginning with address 800000H and address 900000H is to distinguish accesses by the data processors 10 and 10'. Namely, the data processor 10 is accessible to a 1M byte area starting with 800000H, while the processor 10' is accessible to a 1M byte area starting with 900000H. The address decoder 12 serves to control the double addressing system, and it produces a "0" output in response to an address signal having the highest even digit (8H), and produces a "1" output in response to an address signal having the highest digit.

The operation unit 1 has a function set of 16 logical operations as listed in FIG. 7. In order to specify one of the 16 kinds of operations, the operation code data FC is formatted in 4 bits, and the operational function specifying registers 3 and 4 and operational function selector 5 are all arranged in 4 bits. Since the memory 2 is of the 16-bit word length, the write mask registers 6 and 7 and mask selector 8 also have 16 bits.

Figure 15:
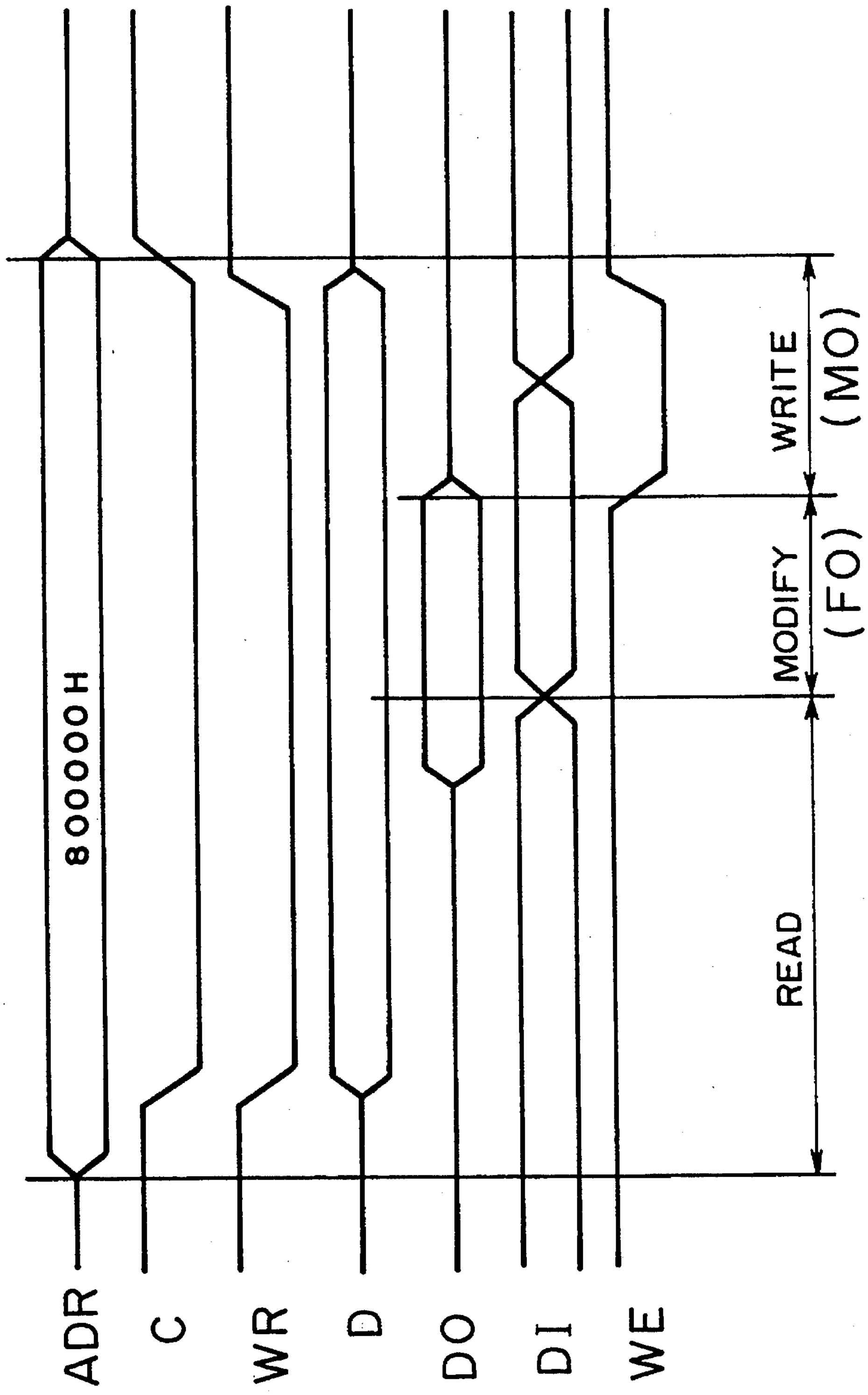
FIG. 15 is a timing chart showing the memory write timing relationship derived from FIG. 13, but with the addition of the selection signal.

Next, operation of the data processor 10 in FIG. 6 in making write access to the frame buffer memory 9 will be described. The data processor 10 has a preset function code F0 in the operational function specifying register 3 and mask data M0 in the write mask register 6. When the data processor 10 makes write access to address 800000H, for example, the memory access operation takes place in the order of reading, modifying and writing in the timing relationship as shown in FIG. 15. In response to the output of address 800000H onto the address bus by the data processor 10, the address decoder 12 produces a "0" output, the operational function selector 5 selects the operational function specifying register 3, and the operation unit 1 receives F0 as operation code data FC. At this time, the write mask selector 8 selects the write mask register 6, and it outputs M0 as WE to the memory 2. In FIG. 15, data in address 800000H is read out in the read period, which is subjected to calculation with write data D from the data processor 10 by the operation unit 1 in accordance with the calculation code data F0 in the modification period, and the result is written in accordance with data M0 in the write period. The write mask data inhibits writing at "0" and enables writing at "1" and the data M0 is given value FFH for the usual write operation.

When another data processor 10' makes access to the frame buffer 9, function code F1 is preset in the operational function specifying register 4 and mask data M1 is preset in the write mask register 7. In order for the data processor 10' to access the same data as one in address 800000H for the data processor 10, it makes write access to address 900000H. The write access timing relationship for the data processor 10' is similar to that shown in FIG. 15, but differs in that the output signal C of the address decoder 12 is "1" during the access, the function code for modification is F1, and the write mask is M1 in this case.

Figure 5:
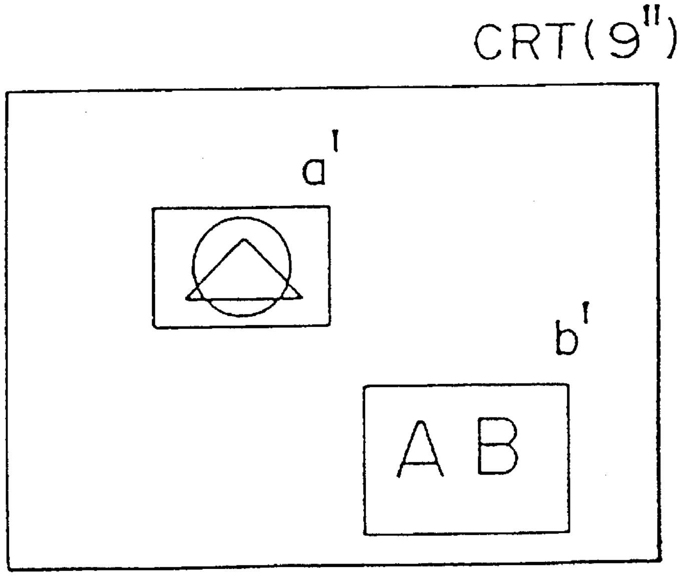
FIG. 5 PRIOR ART
FIG. 5 is a diagram explaining that one processor implements graphic display, and another processor implements character display.

Accordingly, by making the data processors 10 and 10' to access different addresses, the calculation and mask data can be different, and the operational functions need not be set each time, even when the processors implement different display operations as shown in FIG. 5.

Next, arrangement of the frame buffer memory 9 and the method of setting the operational function according to this embodiment will be described.

Figure 8:
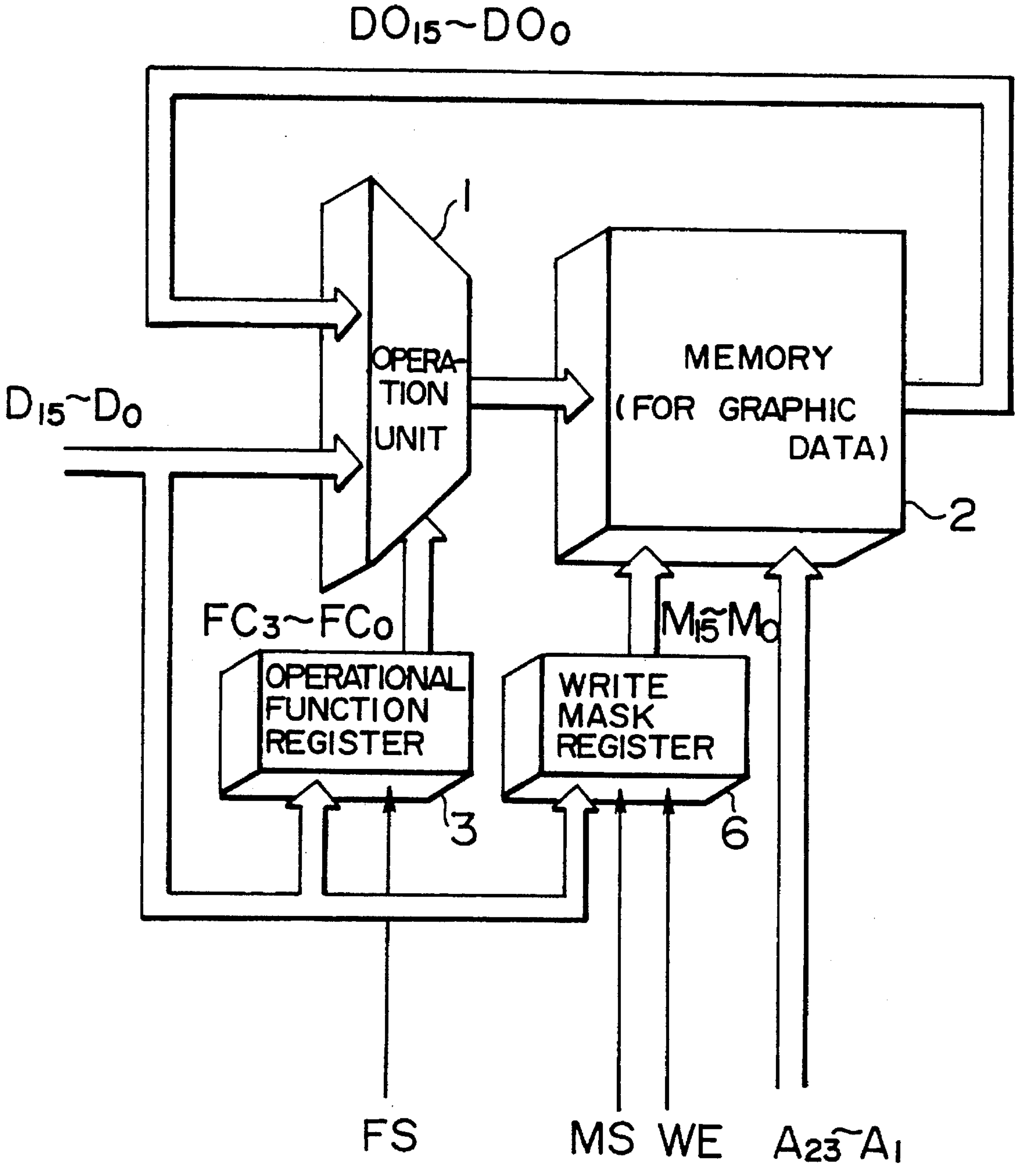
FIG. 8 is a block diagram showing the arrangement of the frame buffer memory according to the present embodiment.

FIG. 8 shows a typical arrangement of the frame buffer according to the present embodiment. Conventionally, a memory has been constructed using a plurality of memory IC (Integrated Circuit) components with external accompaniments of an operation unit 1, operational function specifying register 3 and write mask register 6. The reason for the arrangement of the memory using a plurality of memory IC components is that the memory capacity is too large to be constructed by a single component. The memory is constructed divisionally, each division constituting 1, 2 or 4 bits or the like of data words (16-bit word in this embodiment). For example, when each division forms a bit of data words, at least 16 memory IC components are used. For the same reason when it is intended to integrate the whole frame buffer shown in FIG. 8, it needs to be divided into several IC components. However, as seen from the description of FIG. 9 that follows, the circuitry of FIG. 8 is implemented on a one-chip structure, in accordance with the present embodiment of the invention.

The following describes the method of this embodiment for setting the operational function and write mask data for the sliced memory structure. The setting method will be described on the assumption that a single operational function specifying register and write mask register are provided, since the plurality of these register sets is not significant for the present explanation.

Currently used graphic display units are usually arranged to have operational functions of logical bit operations, and therefore it is possible to divide the operation unit into bit groups of operation data. It is also possible in principle to divide the operation unit on a bit slicing basis for implementing arithmetic operations, through the additional provision of a carry control circuit. The write mask register 6 is a circuit controlling the write operation in bit units, and therefore it can obviously be divided into bit units. The operational function specifying register 3 stores a number in a word length determined from the type of operational function of the operation unit 1, which is independent of the word length of operation data (16 bits in this embodiment), and therefore it cannot be divided into bit groups of operation data. Therefore, the operational function specifying register 3 needs to be provided for each divided bit group. Although it seems inefficient to have the same functional circuit for each divided bit group, the number of elements used for the peripheral circuits is less than 1% of memory elements, and the yearly increasing circuit integration density renders this matter insignificant. However, different from the case of slicing the operational function specifying register 3 into bit groups, partition of the frame buffer shown in FIG. 8 into bit groups of data is questionable. The reason is that the operational function specifying register 3 is designed to receive data signals D15–D0. When the frame buffer is simply sliced into 1-bit groups, the operational function specifying register 3 receives 1-bit data and cannot receive a 4-bit specification code listed in FIG. 7. If, on the other hand, it is designed to supply a necessary number of 1-bit signals to the operational function specifying register 3, the frame buffer must have terminals effective solely for the specification of operational functions, and this will result in an increased package size when the whole circuit is integrated. If it is designed to specify the operational function using the data bus, the number of operational functions becomes dependent on bit slicing of data, and to avoid this the frame memory of this embodiment is intended to specify operational functions using the address bus which is independent of bit slicing.

Figure 9:
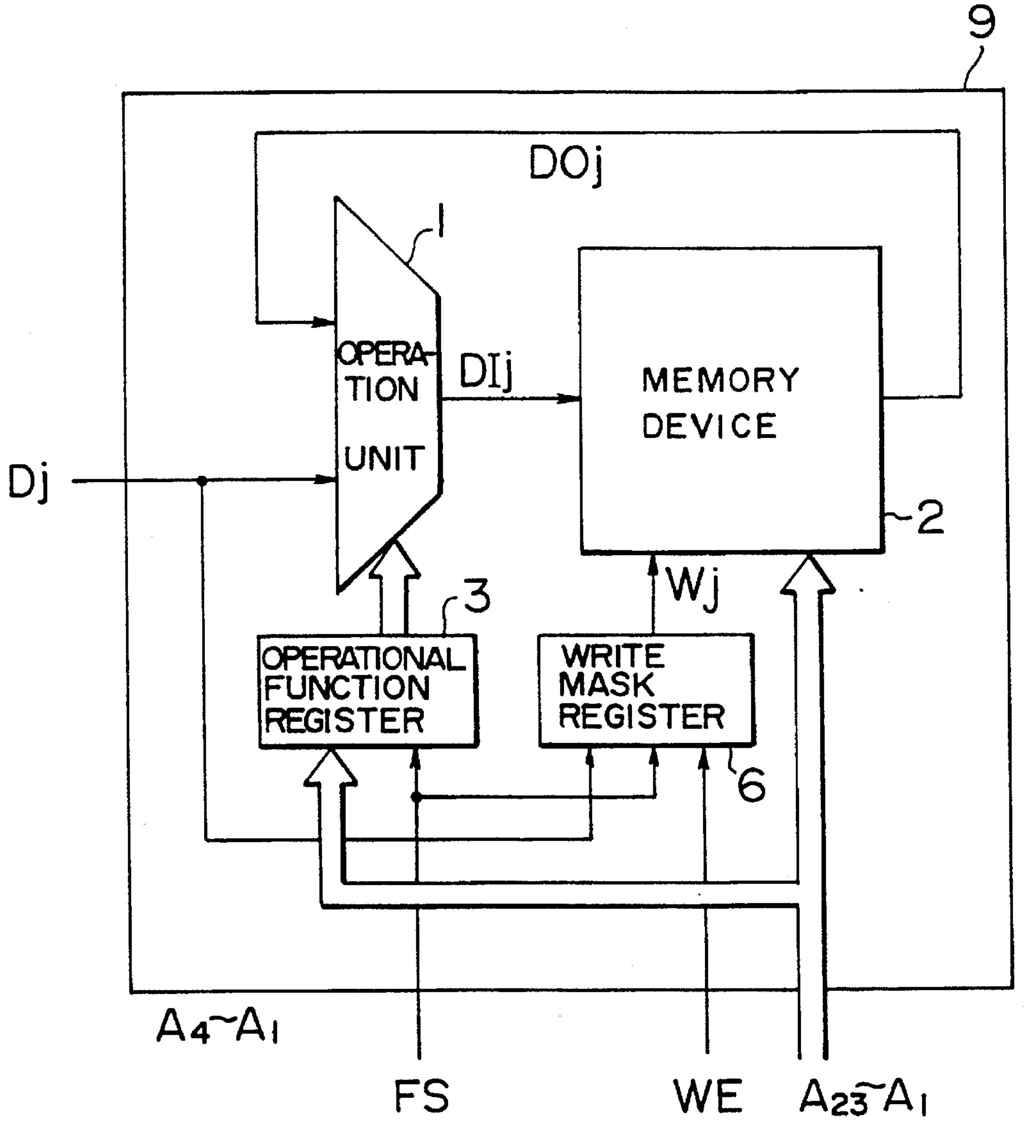
FIG. 9 is a block diagram showing the arrangement of the memory circuit embodying the present invention.

FIG. 9 shows, as an example, the arrangement of the frame buffer memory which uses part of the address signals for specifying operational functions. Symbol Dj denotes a 1-bit signal in the 16-bit data signals from the graphic display data processor, A23–A1 are address signals from the data processor, WE is the write control signal to the data processor, FS is the data setting control signal for the operational function specifying register 3 and write mask register 6, DOj is a bit of data read out of the memory device 2, DIj is a bit of data produced by the operation unit 1, and Wj is the write control signal to the memory device 2.

Figure 10:
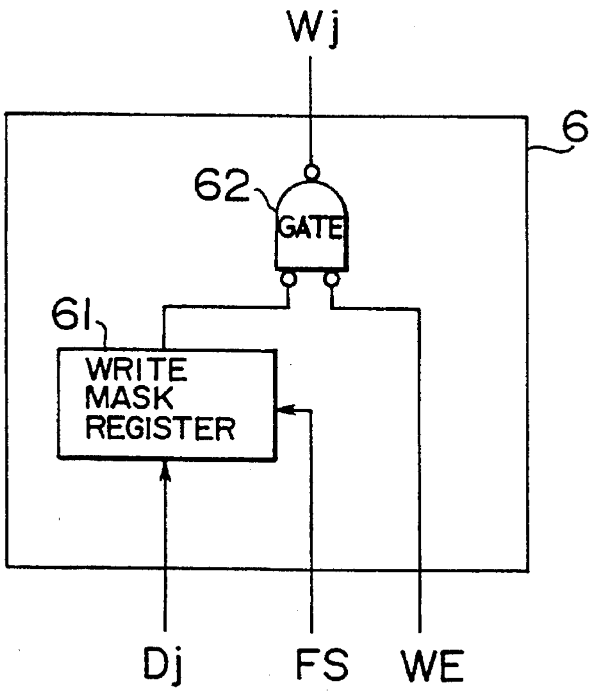
FIG. 10 is a schematic logic diagram showing the write mask circuit in FIG. 9.

FIG. 10 shows, as an example, the arrangement of the write mask register, which includes a write mask data register 41 and a gate 42 for disabling the write control signal WE.

Figure 11:
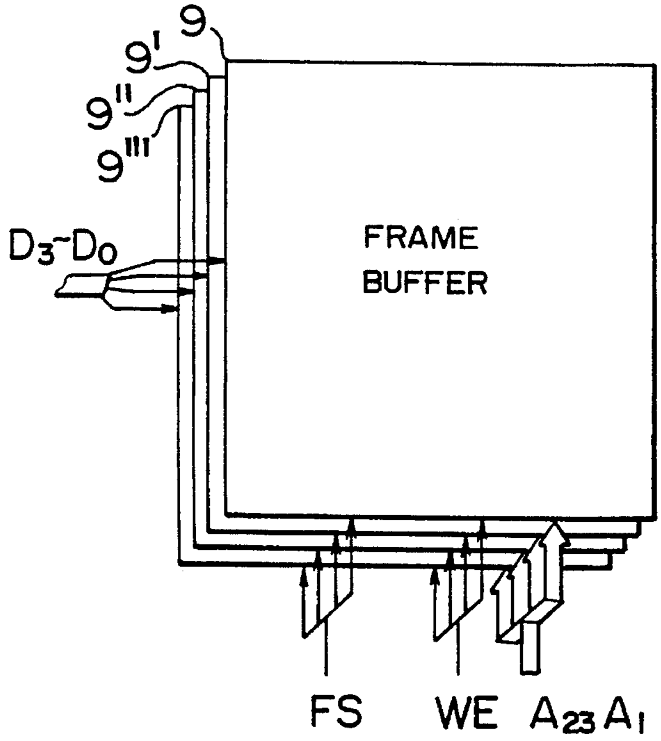
FIG. 11 is a diagram used to explain the frame buffer constructed using the memory circuit shown in FIG. 9.

FIG. 11 shows the arrangement of the frame buffer constructed by using the memory circuit shown in FIG. 9. The figure shows a 4-bit arrangement for clarifying the connection to each memory circuit.

Figure 12:
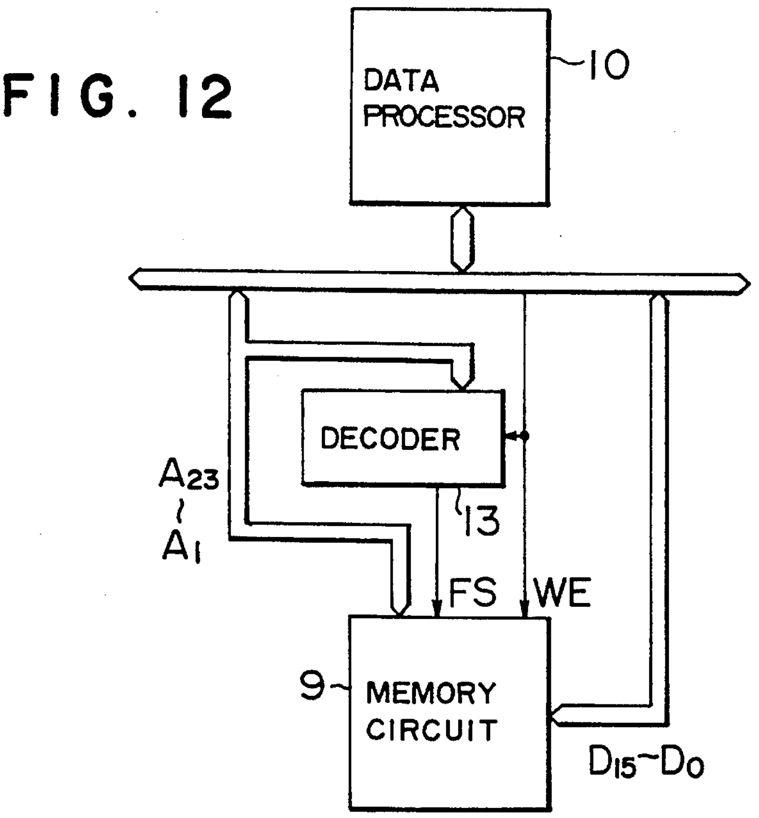
FIG. 12 is a block diagram showing the arrangement of the graphic display system for explaining operation code setting according to this embodiment.

FIG. 12 shows the memory circuit of this embodiment applied to a graphic display system, with the intention of explaining the setting of the operation code. Reference number 10 denotes a data processor, and 13 denotes a decoder for producing the set signal FS.

The following describes the operation of the memory circuit. In this embodiment, an address range 800000H–9FFFFFH is assigned to the memory circuit 9. The decoder 13 produces the set signal FS in response to addresses A00000H–A0001FH. The operation unit 1 has the 16 operational functions as listed in FIG. 7.

When the data processor 10 operates to write data F0FFH in address A00014H, for example, the decoder 13 produces the set signal FS to load the address bit signals A4–A1, i.e., 1010B (B signifies binary), in the operational function specifying register 3. Consequently, the operation unit 1 selects the logical-sum operation in compliance with the table in FIG. 7. In the write mask register 6, a bit of 16-bit data F0FFH from the data processor 10, the bit position being the same as the bit position of the memory device, is set in the write mask data register 61. As a result, F0FFH is set as write mask data.

Figure 13:
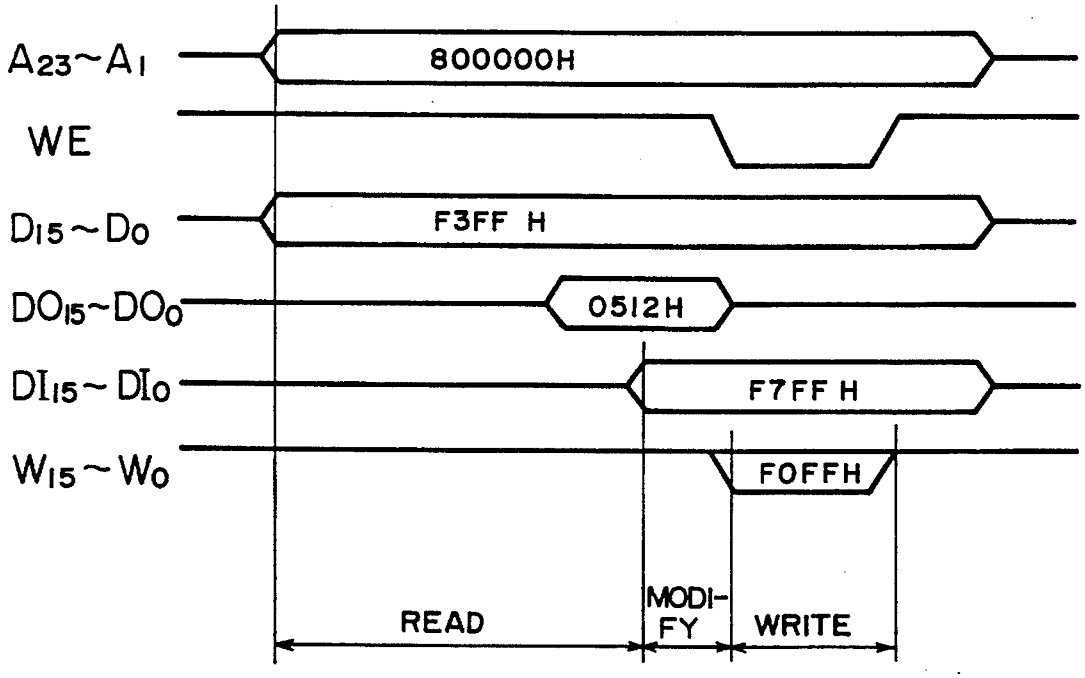
FIG. 13 is a timing chart showing the memory access timing relationship according to this embodiment.

Next, the operation of the data processor 10 for writing F3FFH in address 800000H will be described. It is assumed that the address 800000H has received the contents of 0512H in advance. FIG. 13 shows the timing relationship of memory access by the data processor 10. The write access to the memory circuit 9 by the data processor 10 is the read-modify-write operation as shown in FIG. 13. In the read period of this operation, data 0512H is read out onto the DO bus, and the D bus receives F3FFH. In the subsequent modification period, the operation unit 1 implements the operation between data on the D bus and DO bus and outputs the operation result onto the DI bus. In this example, the D bus carries F3FFH and the DO bus carries 0512H, and the DI bus will have data F7FFH as a result of the logical-sum operation which has been selected for the operation unit 1. Finally, in the write period of the read-modify-write operation, data F7FFH on the DI bus is written in the memory device. In this case, F0FFH has been set as write mask data by the aforementioned setting operation, and a "0" bit of mask data enables the gate 62, while "1" bit disables the gate 62 as shown in FIG. 10, causing only 4 bits (D11–D8) to undergo the actual write operation, with the remaining 12 bits being left out of the write operation. Consequently, data in address 800000H is altered to 0712H.

The foregoing embodiment of this invention provides the following effectiveness. Owing to the provision of the operation specifying registers 3 and 4 and the write mask registers 6 and 7 in correspondence to the data processors 10 and 10', specification of a modification function for the read-modify-write operation and mask write specification are done for each data processor even asynchronous and independent write access to the frame buffer memory 9 by the data processors 10 and 10' independently and independently, which eliminates the need for arbitration control between the data processors, whereby both processors can implement display processings without interference from each other except for an access delay caused by conflicting accesses to the frame buffer memory 9.

The above embodiment is a frame buffer memory for a graphic display system and the data processors 10 and 10' mainly perform the coordinate calculations for pixels. The two data processors can share in the coordinate calculation and other processes when they consume much time, thereby reducing the processing time and thus minimizing the display wait time. For the case of a time-consuming frame buffer write processing, the use of the read-modify-write operation reduces the frequency of memory access, whereby a high-speed graphic dispaly system operative with a minimal display wait time can be realized.

The above embodiment uses Dart of the address signal for the control signal, and consequently a memory circuit operative in read-modify-write mode with the ability of specifying the operational function independent of data slicing methods can be realized. On this account, when all functional blocks are integrated in a circuit component, the arrangement of the memory section can be determined independently of the read-modify-write function.

Although in the foregoing embodiment two data processors are used, needless to say a system including three or more data processors can be constructed utilizing the same principle.

The present invention is obviously applicable to a system in which a single data processor initiates several tasks and separate addresses are assigned to the individual tasks for implementing parallel display processings.

Figure 14:
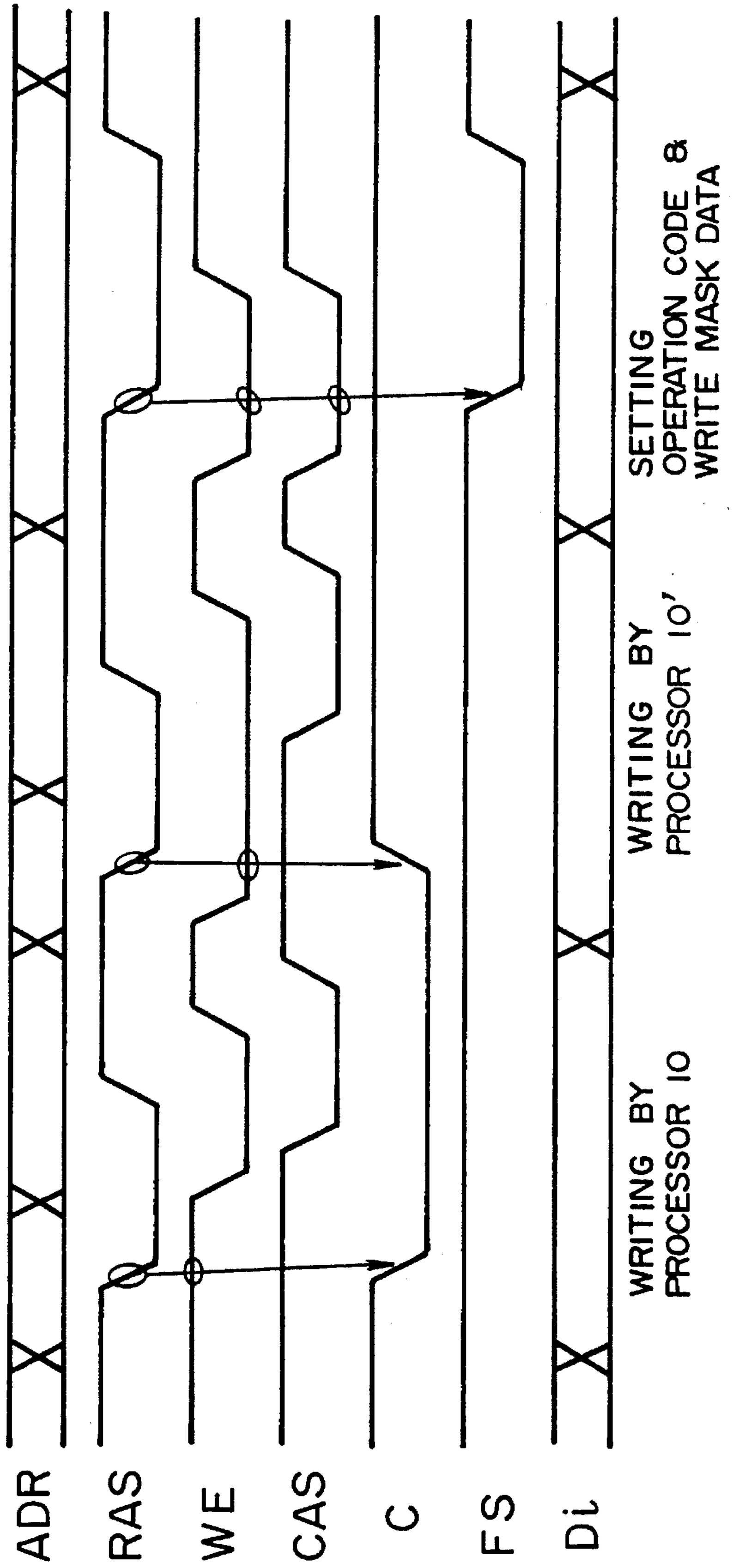
FIG. 14 is a timing chart showing the generation of the selection signal and operation code setting signal based on the memory access timing relationship.

The memory circuit of the above embodiment differs from the usual memory IC component in that the set signal FS for setting the operational function and write mask data and the signal C for selecting an operational function and write mask are involved. These signals may be provided from outside at the expense of two additional IC pins as compared with the usual memory device, or may be substituted by the aforementioned signals by utilization of the memory access timing relationship for the purpose of minimizing the package size. FIG. 14 shows the memory access timing relationship for the latter method, in which a timing unused in the operation of a usual dynamic RAM is used to distinguish processors (the falling edge of RAS causes the WE signal to go low) and to set the operation code and write mask data (the rising edge of RAS causes CAS and WE signals to go low), thereby producing the FS and C signals equivalently.

Although in the above embodiment a 16-bit data word is sliced into 1-bit groups, these values can obviously be altered.

Although in the above embodiment the operational function and write mask are specified concurrently, they may be specified separately.

It is obvious that the word length for operational function specification may be other than 4 bits.

The above embodiment can also be applied to a memory with a serial output port by incorporating a shift register.

According to this invention, as it is appreciated from the above description, the coordinate calculation process in the display process is shared by a plurality of processors so that the calculation time is reduced, and the frame buffer memory operative in read-modify-write mode can be shared among the processors without the need of arbitration control so that the number of memory access is reduced, whereby a high-speed graphic display system can be constructed.

Moreover, according to this invention, the modification operation for the read-modify-write operation is specified independently of the word length of write data, and this realizes a memory circuit incorporating a circuit which implements the read-modify-write operation in arbitrary word lengths, whereby a frame buffer used in a high-speed graphic display system, for example, can be made compact.

We claim:

1. A memory device comprising:

a plurality of memory elements;

an address port which inputs address data during a second cycle and data for presetting an access mode during a first cycle;

a register which stores the data for presetting the access mode during the first cycle;

a read/write unit which accesses the memory elements in accordance with the address data inputted from the address port during the second cycle and the data for presetting the access mode stored in the register during the first cycle;

wherein the data for presetting the access mode inputted from the address port is stored in the register during the first cycle prior to the second cycle during which accesses by the read/write unit to the memory elements are performed, while the address data is presented onto the address port during the second cycle, and all of the address data is used for specifying an address location at a memory access during the second cycle; and wherein the first cycle during which the data for presetting the access mode is stored in the register does not overlap the second cycle during which the address data used for the accesses by the read/write unit to the memory elements are performed.

2. A memory device according to claim 1, wherein the data for presetting the access mode stored in the register corresponds to one access mode selected from a plurality of access modes.

3. A memory device according to claim 2, wherein the selected one access mode is based on the data input from the address port during the first cycle.

4. A memory device according to claim 1, wherein the memory elements are constructed as DRAM.

5. A memory device according to claim 1, wherein the memory elements, the register and the read/write unit are constructed in one integrated circuit.

6. An integrated memory device comprising:

a plurality of memory elements;

an address port which inputs address data during a second cycle and data for presetting an access mode during a first cycle;

a mode register which stores data for presetting the access mode during the first cycle;

a read/write unit which accesses the memory elements in accordance with the address data inputted from the address port during the second cycle and the data for presetting the access mode stored in the mode register during the first cycle; and an internal bus coupled to the memory elements, the mode register and the address port;

wherein the data for presetting the access mode inputted from the address port is stored in the mode register via the internal bus during the first cycle prior to the second cycle during which accesses by the read/write unit to the memory elements are performed, while the address data is presented onto the internal bus during the second cycle, and all of the address data is used for specifying an address location at a memory access during the second cycle; and wherein the memory elements are constructed as a DRAM and wherein the first cycle during which the data for presetting the access mode is stored in the mode register does not overlap the second cycle during which the accesses by the read/write unit to the memory elements are performed.

7. An integrated memory device according to claim 6, wherein the data for presetting the access mode stored in the mode register corresponds to one access mode selected from a plurality of access modes.

8. An integrated memory device according to claim 7, wherein the selected one access mode is based on the data input from the address port during the first cycle.

* * * * *